United States Patent [19]

Frietsch

[11] Patent Number: 4,572,345
[45] Date of Patent: Feb. 25, 1986

[54] CLUTCH PLATE

[75] Inventor: Kurt Frietsch, Bühlertal, Fed. Rep. of Germany

[73] Assignee: LUK Lamellen und Kupplungsbau GmbH, Bühl, Fed. Rep. of Germany

[21] Appl. No.: 501,272

[22] Filed: Jun. 6, 1983

[30] Foreign Application Priority Data

Jul. 30, 1982 [DE] Fed. Rep. of Germany ....... 3228458

[51] Int. Cl.[4] ............................................... F16D 3/14
[52] U.S. Cl. ................. 192/106.2; 192/70.17
[58] Field of Search ............... 192/106.1, 106.2, 70.16, 192/70.17, 70.18; 464/62, 67, 68

[56] References Cited

U.S. PATENT DOCUMENTS 3,362,512 1/1968 Ericson ........................... 192/70.17
4,410,075 10/1983 Caray et al. ...................... 192/106.2

FOREIGN PATENT DOCUMENTS 1918110 7/1977 Fed. Rep. of Germany .
2807824 8/1978 Fed. Rep. of Germany ... 192/106.2
1492982 11/1977 United Kingdom ............. 192/106.2

Primary Examiner—Stephen F. Husar
Attorney, Agent, or Firm—Peter K. Kontler

[57] ABSTRACT

A clutch plate for use in friction clutches of automotive vehicles wherein the hub has an integral flange flanked by and secured to two disc-shaped walls. These walls flank the inner sections of two flat rings forming part of a carrier for the friction linings. The friction linings are secured to flexible segments whose inner portions extend between the outer sections of the rings and are secured thereto by rivets. The inner sections of the rings are held apart by one or more distancing projections provided on one or both rings. The projections of one ring can abut against the adjacent surface of or against registering projections provided on the other ring, and the projections of one ring can be bonded or mechanically secured to the other ring or to the projections of the other ring. A single circumferentially extending projection on one of the rings can replace an entire annulus of discrete projections. Such projection or projections are obtained by bending the material of the respective ring or rings toward the other ring.

20 Claims, 5 Drawing Figures

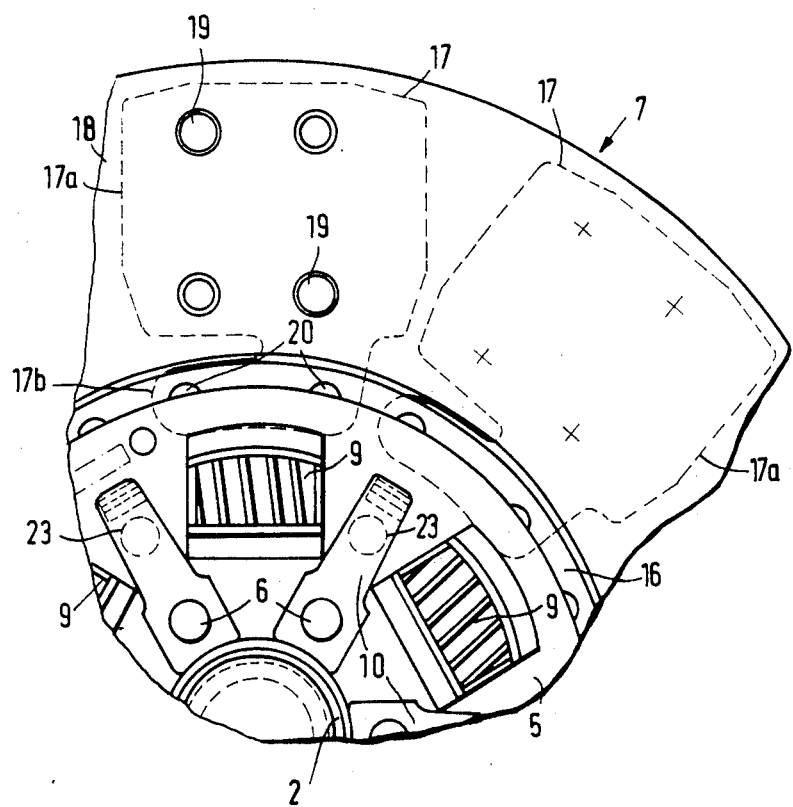
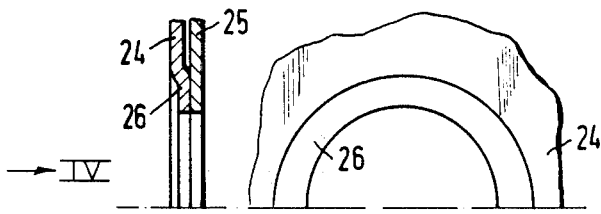
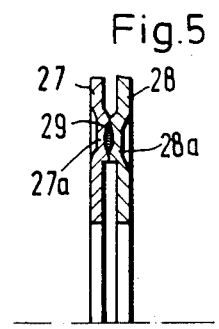

CLUTCH PLATE

BACKGROUND OF THE INVENTION

The present invention relates to clutch plates in general, and more particularly to improvements in clutch plates which can be used in friction clutches of automotive vehicles. Still more particularly, the invention relates to improvements in clutch plates of the type wherein a hub (which can transmit torque to the input shaft of a change-speed transmission) carries two disc-shaped walls which flank a carrier for friction linings. The linings are installed between the flywheel of an automotive vehicle and a pressure plate of the friction clutch to transmit torque from the flywheel to the hub or vice versa. As a rule, the carrier is free to perform limited angular movements with reference to the hub against the opposition of energy storing elements in the form of coil springs or the like.

A clutch plate of the above outlined character is disclosed, for example, in German Auslegeschrift No. 19 18 110 wherein the carrier of friction linings comprises two flat discs which are disposed between the walls on the hub and flank the inner portion of a further disc whose outer portion carries the friction linings. The purpose of the flat discs is to reinforce the carrier, and the further disc extends radially inwardly all the way from the outer to the inner marginal portions of the flat discs. A drawback of such clutch plates is that they are bulky, i.e., their inertia is very pronounced. This is attributable, to a considerable degree, to the dimensions and mass of the further disc whose inner marginal portion is immediately adjacent to the hub and whose outer marginal portion is disposed at a considerable distance from the outer marginal portions of the walls and of the flat discs. The bulk and inertia of the clutch plate contribute to complexity of the synchronizing unit of the transmission which cooperates with and normally receives torque from the clutch plate. Also, the wear upon the transmission is quite pronounced because the transmission must transmit substantial loads due to the bulk and inertia of the carrier of friction linings and hence of the entire clutch plate.

Another drawback of the just described conventional clutch plates is that their manufacturing cost is very high. This is due, to a considerable extent, to the fact that the further disc of the carrier of friction linings is a complete annulus having a large outer diameter. The making of large-diameter annuli from sheets of metallic material entails considerable losses in such material due to the presence of large remnants which develop even if the removal of annuli (e.g., by resorting to a stamping or like machine) leaves the remaining portion of a sheet with holes which are immediately adjacent to each other.

OBJECTS AND SUMMARY OF THE INVENTION

An object of the invention is to provide a friction plate which is simpler and less expensive than but at least as versatile and durable as heretofore known clutch plates including the aforediscussed conventional plate.

Another object of the invention is to provide a clutch plate whose inertia is lower and whose bulk is less than the inertia and bulk of the clutch plate which is disclosed in the aforementioned German publication.

A further object of the invention is to provide a clutch plate which can be used in existing friction clutches as a superior substitute for heretofore known clutch plates.

An additional object of the invention is to provide a novel and improved carrier of friction linings for use in a clutch plate of the above outlined character.

Still another object of the invention is to provide a novel and improved connection between that part of the carrier which is confined between the walls of the hub and the friction linings.

An additional object of the invention is to provide the carrier of the above outlined clutch plate with novel and improved means for maintaining its constituents in proper orientation with reference to each other.

A further object of the invention is to provide a carrier which is just as sturdy as or even sturdier than heretofore known carriers even though its mass is a fraction of the mass of conventional carriers.

Another object of the invention is to provide a clutch plate which does not cause pronounced wear upon the transmission of an automotive vehicle which embodies a friction clutch utilizing the improved clutch plate.

The invention is embodied in a clutch plate, particularly for use in friction clutches of automotive vehicles. The clutch plate comprises a hub having two spaced-apart radially outwardly extending disc-shaped walls (the hub can further comprise a radially outwardly extending flange which is disposed between the radially innermost portions of the walls and is fixedly secured to such walls by rivets or other suitable fastening means), and carrier means having two spaced-apart rings movable as a unit with reference to the hub. The inner sections of the rings (as considered in the radial direction of the hub) are disposed between the walls and the carrier means further comprises flat segments having inner portions disposed between and secured to the outer sections of the rings as well as friction linings which are secured to the outer portions of the segments, as considered in the radial direction of the hub. The clutch plate also comprises energy storing means (e.g., a set of coil springs) interposed between the hub and the carrier means to yieldably oppose relative angular movements between the hub and the carrier means. In accordance with a feature of the invention, the carrier means further comprises novel and improved distancing means disposed between the inner sections of the rings and including at least one projection forming part of one of the rings and in contact with the other of the rings. The projection or projections preferably constitute deformed portions of the one ring or of both rings and each projection can have an at least substantially circular outline.

In one presently preferred embodiment of the clutch plate, the distancing means comprises a plurality of projections provided on at least one of the rings and spaced apart from one another, as considered in the circumferential direction of the hub. Such projections are preferably equidistant from one another, and their number preferably exceeds two. The projection or projections of the distancing means are preferably nearer to the inner than to the outer marginal portions of the rings.

A modified clutch plate can comprise distancing means with one or more projections extending in the circumferential direction of the hub, e.g., with a single projection in the form of a circumferentially complete annulus which surrounds the entire hub.

Still further, the distancing means can comprise at least one projection on each of the rings, and such projections contact each other in the space between the inner sections of the rings. Each ring can comprise a plurality of projections, and each projection of one ring then contacts a discrete projection of the other ring. The projection or projections of one of the rings can be bonded (e.g., welded) to the registering projection or projections of the other ring or, in the absence of projections on the other ring, to that side of the other ring which faces the one ring.

The springs of the energy storing means are preferably disposed radially inwardly of the inner portions of the segments. Each ring is preferably provided with a plurality of openings in the form of windows which are spaced apart from one another, as considered in the circumferential direction of the hub, and receive portions of the aforementioned springs. Each window of one of the rings registers with a discrete window of the other ring. If the distancing means comprises several projections which are spaced apart from one another, as considered in the circumferential direction of the hub, each pair of neighboring projections is preferably separated from each other by at least one pair of registering windows.

The clutch plate can also comprise means for biasing the rings axially of the hub and toward each other so that the projection or projections of one of the rings bear against the other ring or against the registering projections of the other ring. If the registering projections of the two rings are bonded to each other, or if the projection or projections of one of the rings are bonded to the other ring, the just mentioned biasing means can serve the sole purpose of urging the inner section of one of the rings against the adjacent wall of the hub through the medium of the other inner section. The biasing means can comprise at least one spring which is outwardly adjacent to one of the walls and a motion transmitting element which is axially movably installed in the one wall so that the spring can bear against such motion transmitting element which then bears against one ring to urge the other ring against the other wall by way of the one ring. The motion transmitting element can comprise a washer which is interposed between the one wall and the neighboring ring and has at least one prong extending in the axial direction of the hub and through a suitable opening of the one wall so that such prong can be engaged by the spring at the outer side of the one wall.

The novel features which are considered as characteristic of the invention are set forth in particular in the appended claims. The improved clutch plate itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a fragmentary elevational view as seen in the direction of arrow II in FIG. 1;

FIG. 3 is a fragmentary axial sectional view of two rings which form part of modified carrier means and wherein the distancing means comprises a circumferentially complete annular projection on one of the rings;

FIG. 4 is a fragmentary elevational view as seen in the direction of arrow IV in FIG. 3; and FIG. 5 is a fragmentary axial sectional view of two rings forming part of third carrier means and having projections which are bonded to each other.

DESCRIPTION OF THE PREFERRED EMBODIMENTS

Figure 1:
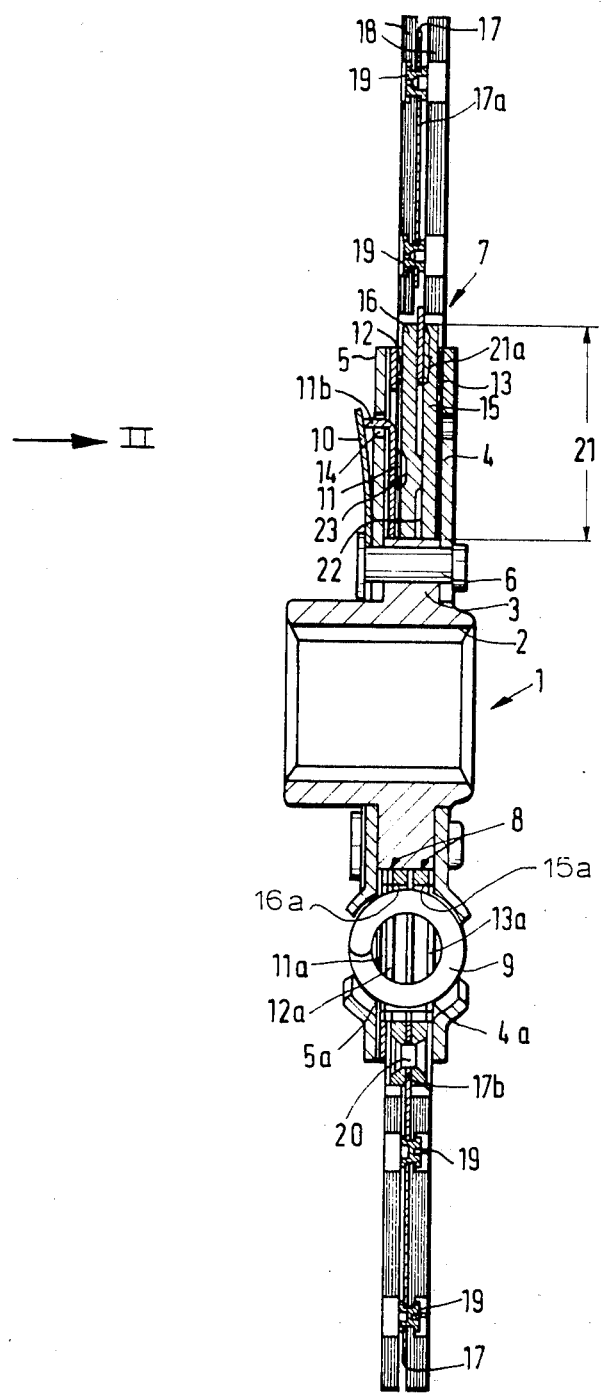
FIG. 1 is an axial sectional view of a clutch plate which embodies one form of the invention and wherein the distancing means between the inner sections of rings forming part of the carrier means comprises several circular projections provided on one of the rings.

Referring to FIGS. 1 and 2, there is shown a clutch plate 1 which can be used in friction clutches of automotive vehicles and comprises a hub 2 having a relatively short radially outwardly extending integral circumferentially complete flange 3 as well as two spaced apart disc-shaped walls 4, 5 which are rigidly secured to the flange 3 by a set of rivets 6 or analogous fastening means. The walls 4 and 5 extend radially outwardly beyond the peripheral surface of the flange 3.

The clutch plate 1 further comprises a carrier 7 having two annular disc-shaped components 15, 16 (hereinafter called rings for short) whose inner sections are received between the outer portions of the walls 4, 5 and whose outer sections extend radially outwardly beyond the peripheral surfaces of these walls. The carrier 7 has limited freedom of angular movement with reference to the hub 2 and vice versa, and such relative movement of the parts 2 and 7 is yieldably opposed by a set of energy storing coil springs 9. A friction generating device 8 is provided to bias the rings 15, 16 of the carrier 7 toward each other and to bias the ring 15 toward or against the wall 4. Each coil spring 9 is installed in a pair of registering openings or windows 4a, 5a which are provided in the respective walls 4, 5 as well as in a pair of registering openings or windows 15a, 16a which are provided in the inner sections of the rings 15, 16, namely, in those sections of the rings which are confined between the walls 4, 5. The coil springs 9 store energy in response to angular movement of the carrier 7 with reference to the hub 2 and/or vice versa under the action of edge faces which bound the respective windows 4a, 5a, 15a and 16a. The windows in each of the walls 4, 5 and in each of the rings 15, 16 are spaced apart from one another, as considered in the circumferential direction of the hub 2.

The friction generating device 8 is also effective while the hub 2 moves relative to the carrier 7 and/or vice versa. This device comprises a set of leaf springs 10 which are adjacent to the outer side of the wall 5 and whose radially innermost portions are secured to the hub 2 by the aforementioned rivets 6, and a motion transmitting element in the form of a washer 11 which is interposed between the inner side of the wall 5 and the respective side of the adjacent ring 16. A friction pad 12 is placed between the washer 11 and the adjacent side of the ring 15. Still further, the friction generating device 8 comprises a second friction pad 13 which is inserted between the ring 15 and the adjacent wall 4. The parts 11, 12, 13 of the friction generating device 8 are respectively provided with openings 11a, 12a, 13a which register with the openings 4a, 5a, 15a and 16a, and such parts of the friction generating device extend from the peripheral surface of the flange 3 (i.e., from the inner marginal portions of the rings 15 and 16) to the outer marginal portions of the rings 15 and 16. The length of the openings 11a, 12a and 13a, as considered in the circumferential direction of the hub 2, at least matches the corresponding dimensions of the respective openings 5a, 6a, 15a and 16a.

The motion transmitting washer 11 has an annulus of protuberances in the form of prongs 11b which extend in substantial parallelism with the axis of the hub 2 and through registering openings 14 in the wall 5. This enables the radially outermost portions of the leaf springs 10 to bear against the tips of the prongs 11b whereby the washer 11 urges the adjacent friction pad 12 against the ring 16 which, in turn, urges the ring 15 against the friction pad 13, i.e., toward the wall 4. In other words, the outer sides of the rings 15, 16 are maintained in engagement with the respective friction pads 13, 12 and the entire carrier 7 is biased away from the wall 5, i.e., toward the inner side of the wall 4.

The carrier 7 further comprises a set of flat segments 17 whose inner portions 17b extend between the outer sections of the rings 15, 16 and are secured thereto by rivets 20 or analogous fastening means. The axially yieldable outer portions 17a of the segments 17 extend radially beyond the rings 15, 16 and are connected with a pair of annular friction linings 18 by one or more annuli of rivets 19 or other suitable fastener means. As can be seen in FIG. 1, the inner portions 17b of the segments 17 extend only through a relatively small distance 21a inwardly of the outer marginal portions of the rings 15, 16, i.e., the distance 21a is a relatively small fraction of the width 21 of the rings 15, 16, as considered in the radial direction of the hub 2.

In order to ensure that the inner sections of the rings 15, 16 will remain spaced apart from one another in the region (note the annular space 22) radially inwardly of the inner portions 17b of the segments 17, the carrier 7 further comprises distancing means in the form of several projections 23 which constitute deformed integral parts of the ring 16 and extend axially of the hub 2 toward and into contact with the adjacent side of the ring 15. As can be seen in FIG. 2, each of the projections 23 has a circular outline and each pair of neighboring projections 23 is separated from one another by at least one coil spring 9, i.e., by at least one pair of registering openings 15a, 16a. It is clear that the number of projections 23 need not match the number of coil springs 9; for example, the ring 16 can be provided with three equidistant projections 23 and the clutch plate 1 can comprise six coil springs 9 so that pairs of coil springs alternate with discrete projections, as considered in the circumferential direction of the hub 2. The projections 23 oppose the tendency of the leaf springs 10 of the friction generating device 8 to move the inner sections of the rings 15, 16 into actual contact with one another. It has been found that three equidistant projections 23 suffice to ensure retention of the inner sections of the rings 15, 16 at a desired distance from one another, as considered in the axial direction of the hub; of course, the number of such projections can be increased to four or more. The stability of the carrier 7 for the friction linings 18 is enhanced if the projections 23 are nearer to the inner than to the outer marginal portions of the rings 15 and 16. This can be readily seen in FIG. 1 wherein the projections 23 are nearer to the peripheral surface of the hub 3 than to the outer edge faces of the rings 15 and 16. Also, the inner portions 17b of the segments 17 which carry the friction linings 18 are preferably disposed radially outwardly of the coil springs 9. This eliminates the need for windows, cutouts or the like in the inner portions 17b because such inner portions are disposed radially outwardly of the openings for the springs 9. As mentioned above, such inner portions 17b extend between the outer sections of and are secured to the rings 15, 16 by an annulus of rivets 20 or the like.

FIGS. 3 and 4 illustrate a portion of a modified carrier which includes two coaxial rings 24, 25. The inner section of the ring 24 is provided with an integral distancing projection 26 which can constitute a circumferentially complete annulus completely surrounding the hub 3 (not shown in FIGS. 3 and 4). However, it is equally within the purview of the invention to replace the circumferentially complete projection 26 with two or more arcuate projections which form an interrupted annulus around the flange of the hub. Also, it is clear that the projections 23 can be provided on the ring 15 of the clutch plate 1 of FIGS. 1 and 2 or that the projection 26 can be provided on the ring 25 of FIGS. 3 and 4.

In the embodiment of FIG. 5, the carrier has two rings 27, 28 whose inner sections are respectively provided with sets of three or more preferably equidistant projections 27a, 28a. Each projection 27a is in register with and contacts a discrete projection 28a, and such registering projection 27a, 28a are bonded to each other by weldants 29. An advantage of the carrier which is shown in FIG. 5 is that the ring 27 can be identical with the ring 28, i.e., that the carrier can be manufactured at a low cost. Such carrier can be used with advantage when the respective clutch plate comprises a set of coil springs or analogous energy storing devices which are equidistant from one another, as considered in the circumferential direction of the hub, so that they can alternate (or that two or more springs can alternate) with discrete pairs of registering projections 27a, 28a. The structure of FIG. 5 can be used with equal or similar advantage in clutch plates wherein the coil springs or other types of energy storing means are not necessarily equidistant from one another, as considered in the circumferential direction of the hub, as long as their array exhibits at least one symmetry axis.

It is clear that the projections 27a, 28a need not necessarily be bonded to one another, i.e., such projections can merely contact or abut each other in the space between the general planes of the two rings 27 and 28. The bond between each pair of projections 27a, 28a can be made by spot welding or by a suitable adhesive. It is also possible to resort to rivets or to other forms of mechanical fastening means as a substitute for the bonds of the type shown in FIG. 5. Still further, it will be appreciated that bonds or mechanical connections can be provided between the projections 23 and the ring 15 of the clutch plate 1 shown in FIGS. 1 and 2, or between the single projection 26 and the ring 25 of FIGS. 3 and 4.

The construction of a carrier in such a way that it employs two identical rings (27, 28) not only reduces the initial cost of the carrier (and hence of the entire clutch plate) but this also reduces the likelihood of improper assembly because it is immaterial whether the ring 27 or 28 is placed next to the wall 5 as long as the projections of one of these rings face the other ring and vice versa.

An important advantage of the improved clutch plate is that the carrier need not employ a circumferentially complete annular component to support the friction linings. Instead, the clutch plate of the present invention employs a plurality of discrete segments 17 which are relatively small and are readily flexible in the axial direction of the hub 2. Also, only the inner portions 17b of the segments 17 must be inserted between and secured to the outer sections of the rings 15, 16 or 24, 25 or 27, 28. In other words, the segments 17 need not extend all the way to the periphery of the hub and/or its flange; this entails savings in material, bulk and cost of the clutch plate. The projections 23, the projection 26 or the projections 27a, 28a occupy only a small percentage of the space 22 in FIG. 1 between the inner sections of the rings 15, 16 or 24, 25 or 27, 28 without affecting the stability of the carrier. The degree to which the inner portions of the segments 17 extend between the outer sections of the rings is selected with a view to ensure safe retention of segments on the rings and to ensure that the bulk of the carrier is reduced to a permissible minimum. FIG. 2 shows that the inner portion 17b of each segment 17 can be secured to the outer sections of the respective rings 15, 16 by a pair of spaced apart rivets 20 or analogous fasteners. The number of segments can be varied within a wide range; the carrier 7 in the clutch plate 1 of FIGS. 1 and 2 is assumed to comprise nine segments. The making of such segments (e.g., by stamping) results in much more economical utilization of blanks from which the segments are made than if the segments were replaced by a circumferentially complete disc whose inner portion extends between the outer sections of the rings and whose outer portion carries the friction linings.

The distancing projections 23, 26 or 27a, 28a can be made simultaneously with the making of the respective rings so that the provision of such distancing projections does not necessitate any additional machining, punching, hammering, embossing and/or other treatment of the rings. The provision of such distancing projections is desirable in order to ensure that the rings 15, 16 or 24, 25 or 27, 28 will remain in optimum positions with reference to each other. The provision of such projections is desirable on the additional ground that a clutch plate preferably comprises some friction generating means which assists the energy storing elements in opposing rotation of the hub with reference to the carrier and/or vice versa. The friction generating means tends to move the rings of the carrier toward each other and the projection or projections on the inner section(s) of one or both rings successfully oppose such tendency of the friction generating means to move the inner sections of the rings nearer to each other. Were the inner sections of the rings 15, 16 or 24, 25 or 27, 28 free to yield to the bias of the springs forming part of the friction generating device, they would assume positions in which they would be in mere linear contact with the adjacent friction pads and the friction generating device would be incapable of offering requisite resistance to rotation of the carrier relative to the hub and/or vice versa. Moreover, tilting of the rings with reference to each other and/or with reference to the adjacent walls of the hub would result in excessive localized wear upon relatively small portions of the components of the friction generating device with attendant pronounced shortening of the useful life of such components. Moreover, the bias of the springs 10 would be unpredictable if these springs were capable of moving the inner sections of the rings nearer to each other.

The provision of a relatively small number of discrete projections on one or both rings normally suffices if the rings are relatively stiff. On the other hand, the provision of one or more arcuate projections, or the provision of a single circumferentially complete projection, will be preferred when the material of the rings (such as the rings 24, 25 of FIGS. 3 and 4) is relatively thin and the rings are readily deformable. The provision of such arcuate projections, or of a circumferentially complete projection, results in an increase of area of contact between the inner sections of the two rings.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A clutch plate, particularly for use in friction clutches of automotive vehicles, comprising a hub having two spaced-apart radially outwardly extending walls; carrier means having two spaced-apart rings movable angularly as a unit with reference to said hub, said rings having inner sections and outer sections, as considered radially of said hub, and said inner sections being disposed between said walls, said carrier means further comprising segments having inner portions disposed between and secured to the outer sections of said rings and outer portions, as considered radially of said hub; friction linings provided on the outer portions of said segments; distancing means provided between the inner sections of said rings and including at least one projection forming part of one of said rings and in contact with the other of said rings; and energy storing means interposed between said hub and said carrier means to yieldably oppose relative angular movement between the hub and the carrier means.

2. The clutch plate of claim 1, wherein said hub further comprises a radially outwardly extending flange disposed between said walls and means for fastening said walls to said flange.

3. The clutch plate of claim 1, wherein said projection constitutes a deformed portion of said one ring.

4. The clutch plate of claim 1, wherein said distancing means comprises a plurality of projections provided on at least one of said rings and being spaced apart from one another, as considered in the circumferential direction of said hub.

5. The clutch plate of claim 4, wherein the number of said projections exceeds two.

6. The clutch plate of claim 5, wherein said projections are at least substantially equidistant from one another, as considered in the circumferential direction of said hub.

7. The clutch plate of claim 1, wherein said projection has a substantially circular outline.

8. The clutch plate of claim 1, wherein said rings have inner and outer marginal portions and said projection is nearer to said inner than to said outer marginal portions.

9. The clutch plate of claim 1, wherein said projection extends in the circumferential direction of said hub.

10. The clutch plate of claim 9, wherein said projection is a circumferentially complete annulus.

11. The clutch plate of claim 1, wherein said distancing means comprises at least one projection on each of said rings and said projections contact each other in the space between the inner sections of said rings.

12. The clutch plate of claim 11, wherein each of said rings comprises a plurality of projections which are spaced apart from one another, as considered in the circumferential direction of said hub, each projection of one of said rings being in contact with a projection of the other of said rings.

13. The clutch plate of claim 1, wherein each of said rings has a plurality of openings which are spaced apart from one another, as considered in the circumferential direction of said hub, and are arranged to receive portions of said energy storing means, the openings of one of said rings being in register with the openings of the other of said rings and said distancing means comprising a plurality of projections provided on at least one of said rings and spaced apart from one another, as considered in the circumferential direction of said hub, each pair of neighboring projections being separated from one another by at least one opening of said one ring.

14. The clutch plate of claim 1, wherein said energy storing means is disposed inwardly of the inner portions of said segments, as considered in the radial direction of said hub.

15. The clutch plate of claim 1, further comprising means for connecting said projection to the other of said rings.

16. The clutch plate of claim 15, wherein said projection is welded to said other ring.

17. The clutch plate of claim 1, wherein each of said rings has a plurality of projections which are spaced apart from one another, as considered in the circumferential direction of said hub, each projection of one of said rings being in register with a projection of the other of said rings and each projection of said one ring being bonded to the respective projection of said other ring.

18. The clutch plate of claim 1, further comprising means for biasing said rings axially of said hub and toward each other so that said projection bears against said other ring.

19. The clutch plate of claim 18, wherein said biasing means comprises at least one spring outwardly adjacent to one of said walls and a motion transmitting element axially movably installed in said one wall, said spring bearing against said motion transmitting element to urge the latter against one of said rings whereby such one ring urges the other of said rings against the other of said walls.

20. The clutch plate of claim 19, wherein said motion transmitting element comprises a washer interposed between said one wall and the neighboring ring and having at least one prong extending substantially axially of said hub, said one wall having an opening through which said prong extends into engagement with said spring.

* * * * *